(12) United States Patent
Sasaki

(10) Patent No.: US 6,538,684 B1
(45) Date of Patent: *Mar. 25, 2003

(54) TELEVISION CONFERENCE SYSTEM INDICATING TIME DATA

(75) Inventor: Akitomo Sasaki, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/564,574

(22) Filed: Nov. 28, 1995

(30) Foreign Application Priority Data

Nov. 29, 1994 (JP) .............................. 6-294382

(51) Int. Cl.$^7$ ................................. H04N 7/14
(52) U.S. Cl. ................................... 348/14.08
(58) Field of Search ............................ 348/14–17, 552, 348/14.07, 14.08, 14.09, 14.06; 345/327–330; 395/200, 34; 379/202–204, 93.17, 93.21; 370/260, 261; 386/4, 52, 55, 60, 62, 65, 69; 360/13, 72.1, 72.2; H04N 7/15

(56) References Cited

U.S. PATENT DOCUMENTS

| | | | | |
|---|---|---|---|---|
| 5,412,773 A | * | 5/1995 | Carlucci et al. | 348/552 |
| 5,440,624 A | * | 8/1995 | Schoof, II | 379/202 |
| 5,506,954 A | * | 4/1996 | Arshi et al. | 379/202 |
| 5,559,875 A | * | 9/1996 | Bieselin et al. | 379/202 |
| 5,710,591 A | * | 1/1998 | Bruno et al. | 379/202 |

FOREIGN PATENT DOCUMENTS

| | | | | |
|---|---|---|---|---|
| EP | 0 580 397 A2 | * | 1/1994 | H04M/11/06 |
| EP | 617562 A2 | * | 9/1994 | H04N/7/15 |
| JP | 02119491 | * | 5/1990 | H04N/7/14 |

* cited by examiner

Primary Examiner—Stella Woo
(74) Attorney, Agent, or Firm—Fitzpatrick, Cella, Harper & Scinto

(57) ABSTRACT

A television conference system for holding a television conference by transmitting and receiving image data between a plurality of information processing devices connected via a communicating unit includes a transmission and reception unit for transmitting and receiving image data, and a display unit for displaying the transmitted and received image data and time data. A television conference system for performing a television conference by transmitting and receiving image information between a plurality of information processing devices connected via communicating means, includes a recording unit for recording image information of each of the information processing devices in a recording medium by relating the image information to time information, a time designation unit for designating an arbitrary time, and a reproduction unit for reproducing the image information of each information processing device recorded in the recording medium in accordance with the time designated by the time designation unit.

13 Claims, 12 Drawing Sheets

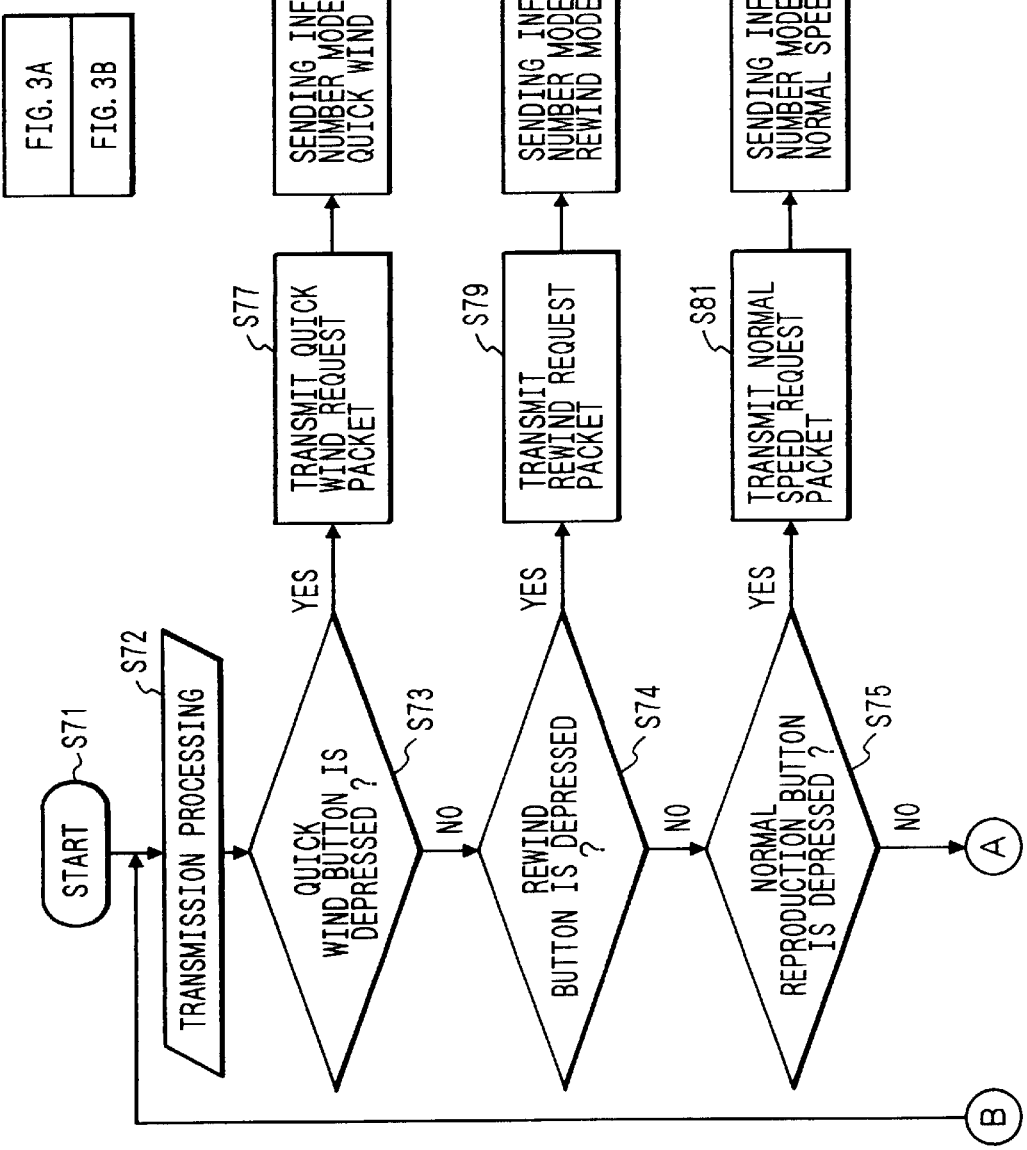

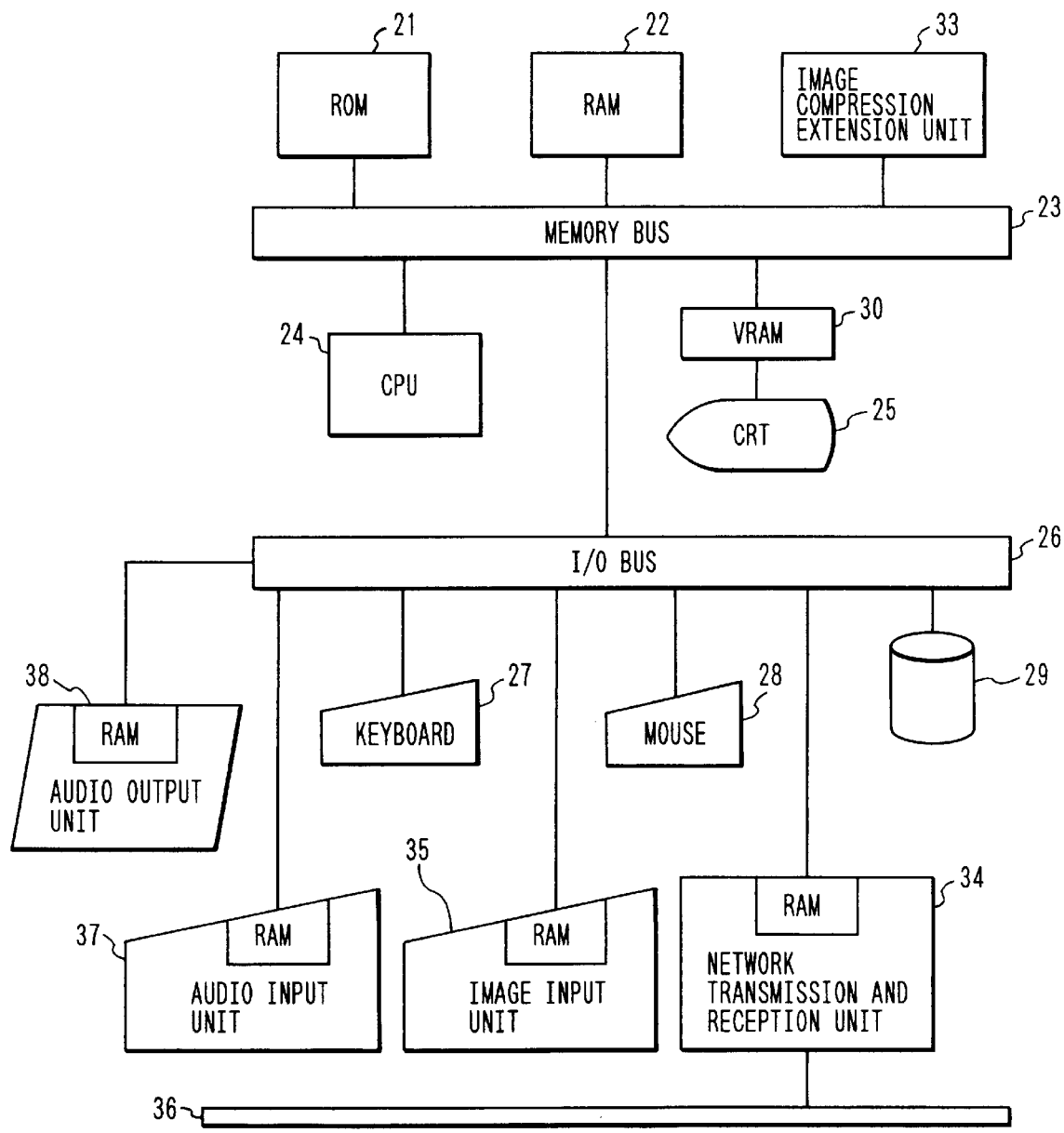

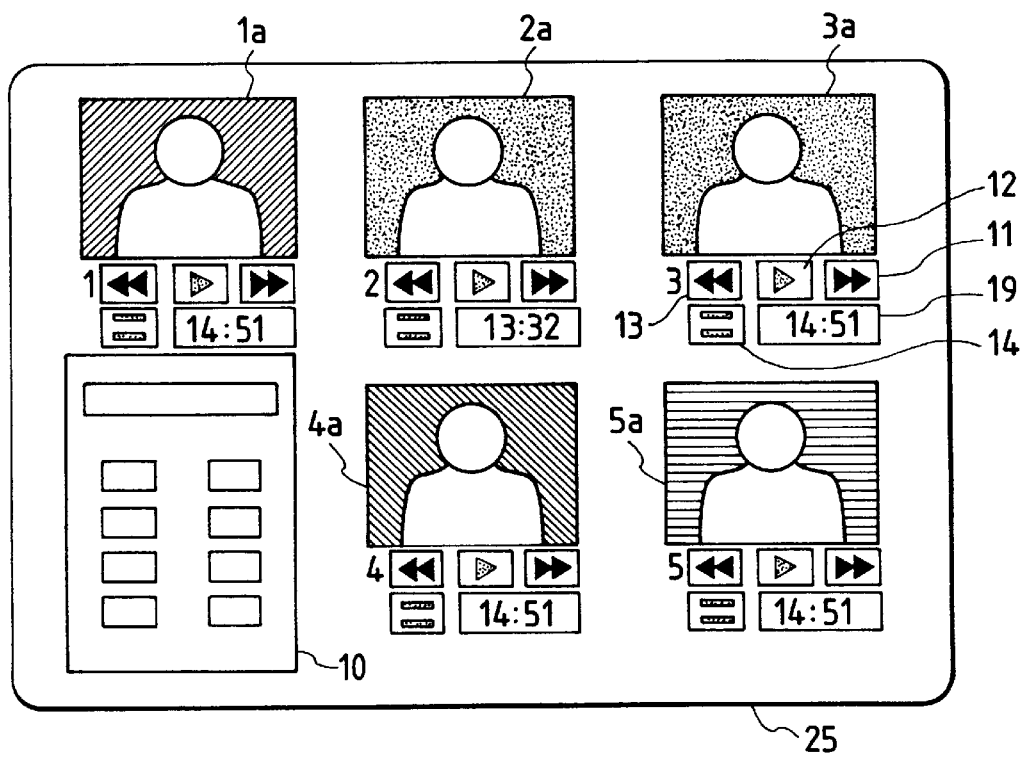
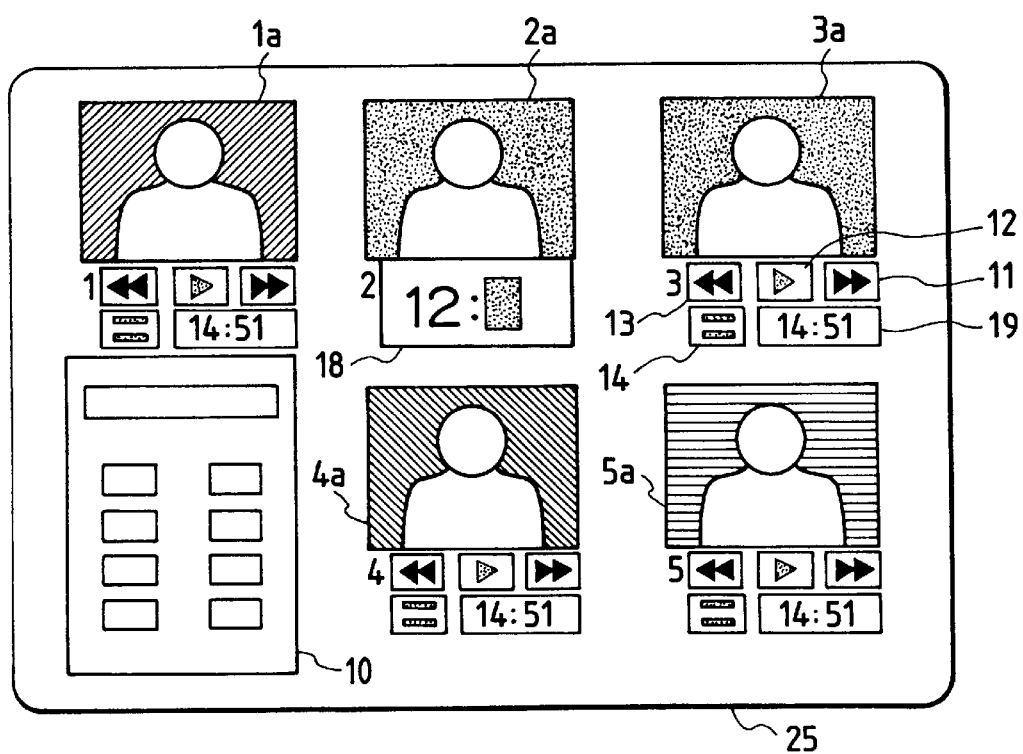

| FIG. 9A |
| FIG. 9B |

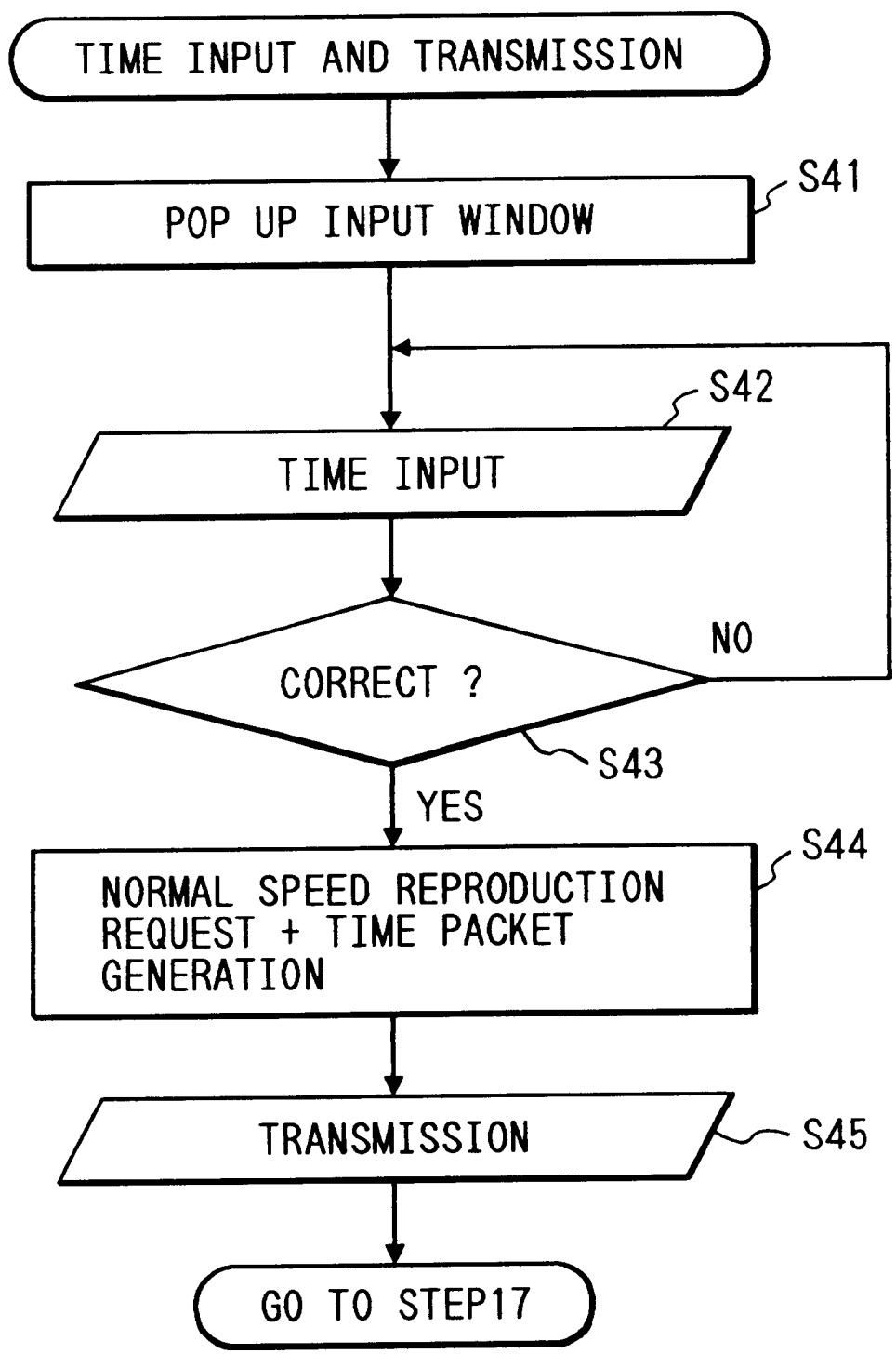

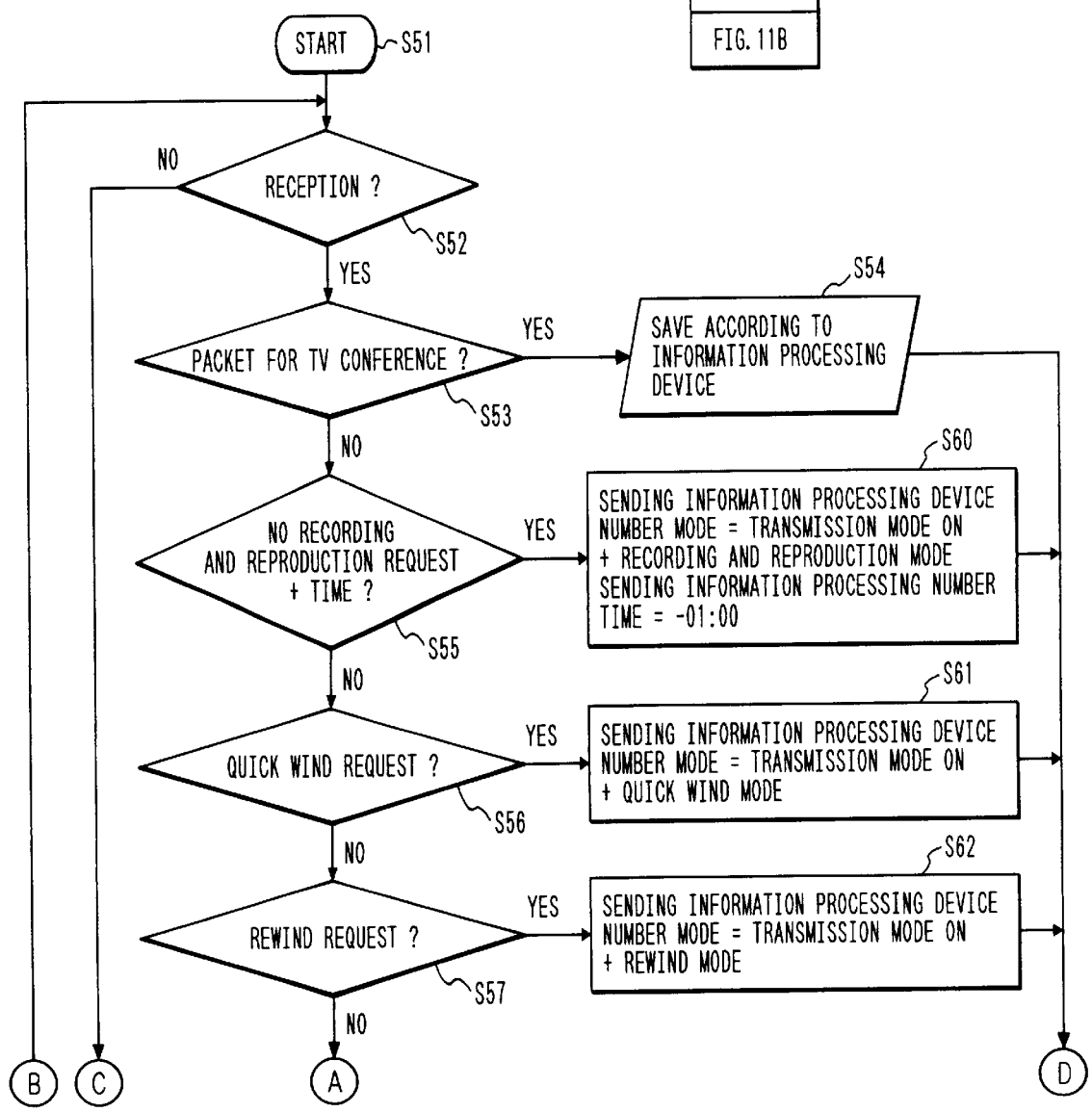
FIG. 11A
FIG. 11
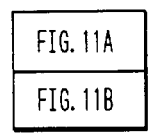

TELEVISION CONFERENCE SYSTEM INDICATING TIME DATA

BACKGROUND OF THE INVENTION

1. Field of the Invention

The present invention relates to a television conference system for holding a television conference by using a plurality of information processing devices capable of communicating with each other.

2. Description of the Related Art

FIG. 1 shows an example of the configuration of a conventional television conference system.

Referring to FIG. 1, first, second, third, fourth, fifth, and sixth information processing devices 1, 2, 3, 4, 5, and 6 are so connected via a network 36 as to be able to communicate with each other.

Of these information processing devices, each of the first to third information processing devices 1 to 3 includes a display 25, a keyboard 27, a mouse 28, a video camera 40, a loudspeaker 41, and a first terminal 50. Note that the fourth and fifth information processing devices 4 and 5 have the same arrangement as the first to third information processing devices 1 to 3, although the illustration of the devices 4 and 5 is simplified in FIG. 1. The first terminal 50 of each of the information processing devices 1 to 5 comprises, e.g., a CPU, a ROM, a RAM, an external storage, and a network transmission and reception unit (none of them is shown). These information processing devices 1 to 5 are used as information processing devices for television conference terminals.

The sixth information processing device 6 includes a display 25, a keyboard 27, a mouse 28, and a second terminal 51. The second terminal 51 has an identical arrangement with that of the first terminal 50 but incorporates a hard disk with a faster speed and larger capacity than those of the hard disk of the first terminal 50. Therefore, the second terminal 51 can read and write a large capacity of various data such as image data and audio data at a high speed.

This sixth information processing device 6 is used as a video server and records image data and audio data transmitted from the information processing devices 1 to 5 through the network 36 into respective corresponding files for the information processing devices 1 to 5. Also, in accordance with requests transmitted from the information processing devices 1 to 5 through the network 36, the information processing device 6 transmits the image data and the audio data recorded as described above to the information processing devices 1 to 5 through the network 36.

FIG. 2 illustrates an example of the display contents on the display 25.

In FIG. 2, image display windows 1a, 2a, 3a, 4a, and 5a display images taken by the video cameras 40 of the first, second, third, fourth, and fifth information processing devices 1, 2, 3, 4, and 5, respectively.

Various buttons for operating this television conference system are arranged on a control box 10. Buttons 11, 12, and 13 are used to reproduce image data and audio data recorded in the past in the sixth information processing device 6, i.e., a quick wind button, a normal reproduction button, and a rewind button, respectively. A normal operation button 14 is used to output image data and audio data currently being picked up to the display 25 and the loudspeaker 41, respectively. These buttons are depressed by a click manipulation using the mouse 28.

A procedure when a given one of the first to fifth information processing devices 1 to 5 used as the terminals of this television conference system requests reproduction of image data and audio data recorded in the past in the sixth information processing device 6 used as the video server of the system and displays the reproduced image, will be described below with reference to the flow chart shown in FIGS. 3A and 3B.

Referring to FIGS. 3A and 3B the systems of the information processing devices 1 to 5 are activated in step S71. In step S72, each of the information processing devices 1 to 5 broadcasts (transmits) input image data from the video camera 40 and input audio data from a microphone (not shown) connected to the video camera 40 to the network 36. In steps S73 to S76, whether any of the quick wind button 11, the normal reproduction button 12, the rewind button 13, and the normal operation button 14, FIG. 2, is depressed is checked.

If it is determined in step S73 that the quick wind button 11 is depressed, the flow advances to step S77, and a packet containing the number (one of 1 to 5) of the information processing device corresponding to one of the display windows 1a to 5a, FIG. 2, in which the quick wind button 11 is depressed and also containing the quick wind request, is transmitted to the sixth information processing device 6 as the video server. In step S78, the mode of the display window in which the quick wind button 11 is depressed is set to a "recording and reproduction quick wind mode" which quickly reproduces the image data and the audio data recorded in the sixth information processing device 6.

If it is determined in step S74 that the rewind button 13 is depressed, the flow advances to step S79, and a packet containing the number of the information processing device corresponding to one of the display windows 1a to 5a, FIG. 2, in which the rewind button 13 is depressed and also containing the rewind request is transmitted to the sixth information processing device 6. In step S80, the mode of the display window in which the rewind button 13 is depressed is set to a "recording and reproduction rewind mode" which reproduces the image data and the audio data recorded in the sixth information processing device 6 while rewinding these data.

If it is determined in step S75 that the normal reproduction button 12 is depressed, the flow advances to step S81, and a packet containing the number of the information processing device corresponding to one of the display windows 1a to 5a, FIG. 2, in which the normal reproduction button 12 is depressed and also containing the normal speed reproduction request, is transmitted to the sixth information processing device 6. In step S82, the mode of the display window in which the normal reproduction button 12 is depressed is set to a "recording and reproduction normal speed mode" which reproduces the image data and the audio data recorded in the sixth information processing device 6 at a normal speed.

If it is determined in step S76 that the normal operation button 14 is depressed, the flow advances to step S83, and a packet containing the number of the information processing device corresponding to one of the display windows 1a to 5a, FIG. 2, in which the normal operation button 14 is depressed and also containing the normal operation request is transmitted to the sixth information processing device 6. In step S84, the mode of the display window in which the normal operation button 14 is depressed is set to a "normal mode" which performs a normal television conference.

After the processing corresponding to the depression of any of the buttons 11 to 14 is done as described above, it is checked in step S85 whether a packet transmitted through the network 36 is received. If no packet is received, the flow returns to the transmission processing in step S72. If a packet is received in step S85, the flow advances to step S86 to check whether the received packet is for the television conference.

If the received packet is not for the television conference, the flow advances to step S87 to check whether the received packet is a reproduction stop request packet sent from the sixth information processing device 6. If the received packet is the reproduction stop request packet, the flow advances to step S88 to check which of the windows 1a to 5a the packet corresponds to. The mode of the corresponding window is then set to the normal mode. If the received packet is not the reproduction stop request packet, normal packet processing is performed in step S89.

On the other hand, if it is determined in step S86 that the received packet is for the television conference, the flow advances to step S90 to check whether the packet is sent from the sixth information processing device 6 as the video server. If it is determined in step S91 that the received packet is sent from the video server, the flow advances to step S92 to check the recorded data of which of the information processing devices 1 to 5 is used to reproduce the image data and the audio data contained in the packet.

In step S93, the reproduced image is displayed in the display window corresponding to the number of the information processing device thus found and the reproduced voice is output to the loudspeaker 41. As an example, if the image data contained in the packet is reproduced from the recorded data of the second information processing device 2, the reproduced image is displayed in the second display window 2a.

If it is determined in step S91 that the received packet is not the packet from the sixth information processing device 6 as the video server, the flow advances to step S94 to check the mode of the display window corresponding to the sending information processing device of the packet. For example, if the packet sending device is the second information processing device 2, the mode of the second display window 2a is checked.

If the checked mode is other than the normal mode (i.e., any of the recording and reproduction quick wind mode, the recording and reproduction rewind mode, and the recording and reproduction normal speed mode), this means that the image and voice from the sixth information processing device 6 are being reproduced. Accordingly, the packet is destroyed in step S95. For example, if the received packet is sent from the second information processing device 2 and the mode of the second display window 2a is the recording and reproduction normal speed mode, the packet is destroyed. If the mode of the packet sending device is the normal mode, the flow advances to step S96 to display the image contained in the packet in the display window corresponding to the sending information processing device.

A procedure when the sixth information processing device 6 as the video server reproduces the image data and the audio data of a speaker recorded in the past in the internal second terminal 51 in accordance with requests from the information processing devices 1 to 5 will be described below with reference to the flow chart shown in FIG. 4.

Referring to FIG. 4, the system of the sixth information processing device 6 is activated in step S101. In step S102, the sixth information processing device 6 checks whether a packet sent from any of the first to fifth information processing devices 1 to 5 is received. If no packet is received, the flow jumps to processing in step S114. If a packet is received, the flow advances to step S103, and the sixth information processing device 6 checks whether the received packet is for the television conference.

If the received packet is for the television conference, in step S104 the sixth information processing device 6 checks the sending information processing device of the packet and writes the data contained in the packet into the file corresponding to the packet sending device. The flow then jumps to step S114. On the other hand, if the received packet is not for the television conference, the sixth information processing device 6 checks the request of the received packet in steps S105 to S108.

If the sixth information processing device 6 determines in step S105 that the received packet is the recording and reproduction normal speed request packet transmitted in step S81, FIGS. 3A and 3B, the flow advances to step S109. In step S109, the sixth information processing device 6 sets a sending information processing device number mode, which indicates whether the image data and the audio data are to be transmitted to the sending information processing device of the packet, to a "transmission mode ON+recording and reproduction mode".

If the sixth information processing device 6 determines in step S106 that the received packet is the recording and reproduction quick wind request packet transmitted in step S77, FIG. 3A, the flow advances to step S110, and the sending information processing device number mode is set to a "transmission mode ON+quick wind mode".

If the sixth information processing device 6 determines in step S107 that the received packet is the recording and reproduction rewind request packet transmitted in step S79, FIG. 3A, the flow advances to step S111, and the sending information processing device number mode is set to a "transmission mode ON+rewind mode".

If the sixth information processing device 6 determines in step S108 that the received packet is the normal operation request packet transmitted in step S83, FIG. 3B, the flow advances to step S112, and the sending information processing device number mode is set to a "transmission mode OFF". If the received packet is none of these packets, the sixth information processing device 6 performs normal packet processing in step S113.

After performing the processing corresponding to the type of received packet in this manner, in step S114 the sixth information processing device 6 checks, for each of the information processing devices 1 to 5, the contents of the sending information processing device number mode set as described above. The sixth information processing device 6 forms a packet of image data and audio data in accordance with the checked sending information processing device number mode.

For example, if the transmission mode is ON and is the quick wind mode, the sixth information processing device 6 successively forms packets of one frame by using the image data of a frame skipped by several frames in the forward direction from the last frame used of a plurality of consecutive frames. If the transmission mode is ON and is the rewind mode, the sixth information processing device 6 successively forms packets of one frame by using the image data of a frame skipped by several frames in the backward direction from the last frame used of a plurality of consecutive frames. If the transmission mode is ON and the recording and reproduction mode is set, packets of one frame is successively formed by using the image data of a plurality of frames succeeding in the forward direction.

Note that no last image data used exists immediately after the transmission mode is turned on. If this is the case, therefore, a packet of one frame is formed by using the first image data in the case of the quick wind mode or the recording and reproduction mode, and by using the latest image data in the rewind mode case.

In step S115, the sixth information processing device 6 transmits the packets formed as described above to the request source of the first to fifth information processing devices 1 to 5. If the sixth information processing device 6 determines in step S116 that no accumulated data is left in the device 6 (when data to be reproduced exceeds the trailing end of the data in the quick wind mode or in the recording and reproduction mode, or when data to be reproduced exceeds the leading end of the data in the rewind mode), the sixth information processing device 6 transmits a reproduction stop request packet to the corresponding information processing device in step S117. This reproduction stop request packet is interpreted in step S87, FIG. 3B, and consequently the corresponding information processing device as the conference terminal is set in the normal mode.

With the above configuration, the image and voice of a speaker in front of one conference terminal information processing device can be transmitted to and displayed on other conference terminal information processing devices, and this makes a television conference feasible. Additionally, the sixth information processing device 6 as the video server can record the images and voices of speakers in front of the conference terminal information processing devices 1 to 5 and can reproduce the past recorded data of each of the information processing devices 1 to 5 in accordance with a request from any of the information processing devices 1 to 5.

Unfortunately, the above conventional system does not have a means for indicating that an image and a voice recorded in the past are currently being reproduced, while these past recorded image and voice are being reproduced. Accordingly, it is difficult for a user to determine whether the displayed image in any of the display windows 1a to 5a and the output voice from the loudspeaker 41 are taken from a television conference currently being normally held or are reproduced from the image and voice recorded in the past. Furthermore, in the latter case the user cannot easily recognize when these image and voice were recorded.

Also, in reproducing the image and voice recorded in the past, the user uses the quick wind button 11 and the rewind button 13 to search for a desired recorded image. Accordingly, the user cannot easily find the past image and voice which he or she wants to see and hear.

SUMMARY OF THE INVENTION

The present invention has been made in consideration of the above situation and has as its object to provide a television conference system in which a user can readily recognize when an image displayed in a display unit is taken and can easily search for and reproduce a desired recorded image.

To achieve the above object, according to one preferred aspect of the present invention a television conference system for holding a television conference by transmitting and receiving image data between a plurality of information processing devices connected via communicating means, comprises transmitting and receiving means for transmitting and receiving image data, and display means for displaying the transmitted and received image data and time data.

According to another preferred aspect of the present invention, a television conference system for holding a television conference by transmitting and receiving image information between a plurality of information processing devices connected via communicating means, comprises recording means for recording image information of each of the information processing devices in a recording medium by relating the image information to time information, time designating means for designating an arbitrary time, and reproducing means for reproducing the image information of each of the information processing devices recorded in the recorded medium in accordance with the time designated by the time designating means.

Other objects, features, and advantages of the invention will become apparent from the following detailed description taken in conjunction with the accompanying drawings.

BRIEF DESCRIPTION OF THE DRAWINGS

FIG. 6 is a block diagram showing the configuration of hardware for realizing the individual functional blocks in FIG. 5;

FIG. 7 is a view showing one example of the display contents in a television conference system as one embodiment of the present invention;

FIG. 8 is a view showing one example of the display contents when a specific time is input in the television conference system of this embodiment;

FIG. 10 is a flow chart showing a time input operation; and

DETAILED DESCRIPTION OF THE PREFERRED EMBODIMENT

A preferred embodiment of the present invention will be described below with reference to the accompanying drawings.

Figure 5:
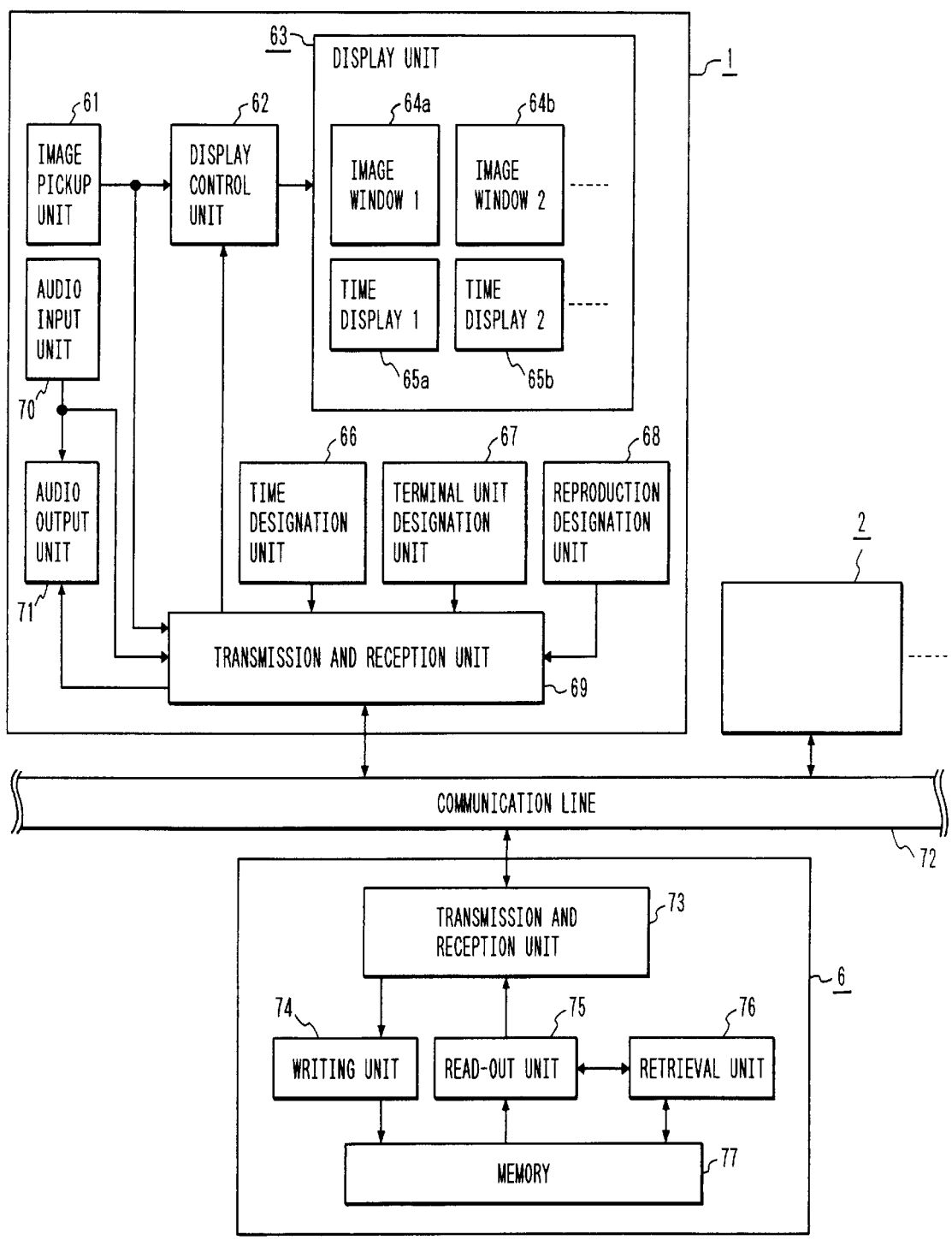
FIG. 5 is a functional block diagram showing the elemental characteristic features of the present invention.

FIG. 5 is a functional block diagram showing the elemental characteristic features of the present invention. FIG. 6 illustrates the configuration of hardware for implementing the individual functional blocks of each information processing device shown in FIG. 5.

In FIG. 5, first, second, and sixth information processing devices 1, 2, and 6 are so connected via a communication line 72 as to be able to communicate image data and audio data with each other. Note that these information processing devices 1, 2, and 6 correspond to the information processing devices illustrated in FIG. 1.

In the configuration of the first information processing device 1, image data taken by an image pickup unit 61 is supplied to a display unit 63 via a display control unit 62 and displayed in a first image window 64*a*. The image data taken by the image pickup unit 61 is also supplied to a transmission and reception unit 69 together with input audio data from an audio input unit 70. These image and audio data are transmitted to the second and sixth information processing devices 2 and 6 through the communication line 72.

Although not shown, the internal configuration of the second information processing device 2 is identical with that of the first information processing device 1 described above. That is, image data taken by an image pickup unit 61 and input audio data from an audio input unit 70 of the second information processing device 2 are transmitted to the first and sixth information processing devices 1 and 6 through the communication line 72. The image data transmitted from the second information processing device 2 to the first information processing device 1 is supplied to the display unit 63 via the display control unit 62 and displayed in a second image window 64*b*. The audio data is output to an audio output unit 71.

In this manner, the first and second information processing devices 1 and 2 can perform a television conference by communicating the image and audio data with each other. In this embodiment, not only the image data from the first and second information processing devices 1 and 2 are displayed in the first and second image windows 64*a* and 64*b*, but also predetermined time information is displayed on each of first and second time displays 65*a* and 65*b*. Consequently, while a television conference is being normally held a current time is displayed on these time displays 65*a* and 65*b*.

The image and audio data transmitted from the first and second information processing devices 1 and 2 to the sixth information processing device 6 as described above are supplied to a writing unit 74 via a transmission and reception unit 73. The writing unit 74 writes the image and audio data in a memory 77 in the form of respective corresponding files of the information processing devices 1 and 2. Information indicating the time at which these image and audio data are recorded also is written in the memory 77.

The user of the first or second information processing device 1 or 2 gives instructions to the sixth information processing device 6 through the communication line 72. Consequently, it is possible to reproduce the past recorded image and voice written in the memory 77, display the image in the display unit 63 of the first or second information processing device 1 or 2, and output the voice from the audio output unit 71 of that device.

More specifically, the user designates the past recorded image of which information processing device he or she wants to see by using a terminal unit designation unit 67 of, e.g., the first information processing device 1 and also designates reproduction of the recorded image by using a reproduction designation unit 68 of that device. These pieces of information are transmitted to the sixth information processing device 6 through the communication line 72. In the sixth information processing device 6, a read-out unit 75 reads out the image data and the audio data corresponding to the transmitted information and information indicating the recording time from the memory 77. The readout data and time information are transmitted to the first information processing device 1 through the communication line 72.

For example, when the terminal unit designation unit 67 designates the second information processing device 2, the past recorded data and the recording time of the second information processing device 2 are read out from the memory 77 and transmitted to the first information processing device 1. The transmitted image data is displayed in the second image window 64*b* of the display unit 63, and the recording time is displayed on the second time display 65*b* of the display unit 63. Also, the audio data is output to the audio output unit 71.

As described above, while the image data and the audio data corresponding to the second information processing device 2 are being reproduced from the memory 77, the time at which these image and audio data were recorded in the past is displayed on the second time display 65*b*. Meanwhile, a current time is displayed on the first time display 65*a*. Accordingly, by monitoring the display contents on the time displays 65*a* and 65*b* the user can readily recognize whether the images displayed in the image windows 64*a* and 64*b* and the output voice from the audio output unit 71 are taken from a television conference currently being normally held or are reproduced from the image and the voice recorded in the past. Also, while an image and a voice recorded in the past are being reproduced, the user can easily know when these image and voice were recorded.

Consequently, the users of the first and second information processing devices 1 and 2 can easily search for a desired recorded image and voice by performing quick wind reproduction and rewind reproduction while monitoring the display contents on the time displays 65*a* and 65*b*. However, each user can more readily find a desired image and voice by the use of a time designation unit 66.

That is, the user designates the information processing device the past recorded image and voice of which he or she wants to reproduce by using the first terminal unit designation unit 67, and also designates a given time by using the time designation unit 66. These pieces of information are transmitted to the sixth information processing device 6 through the communication line 72.

In the sixth information processing device 6, the read-out unit 75 reads out the recorded data corresponding to the transmitted information together with information of the recording time from the memory 77. That is, the read-out unit 75 searches the memory 77 for the recorded data which corresponds to the information processing device designated by the terminal unit designation unit 67 and was recorded at the time designated by the time designation unit 66, and reads out the found recorded data from the memory 77.

The recorded data and the recording time information thus read out are transmitted to the first information processing device 1 through the communication line 72. The transmitted image data is displayed in the second image window 64*b* of the display unit 63, and the recording time is displayed on the second time display 65*b* of the display unit 63. Also, the audio data is output to the audio output unit 71.

In the configuration shown in FIG. 5, the image data and the audio data taken by the information processing devices 1 and 2 are recorded in the sixth information processing device 6 used as the video server and reproduced in accordance with instructions from the information processing devices 1 and 2. However, it is also possible to equip each of the information processing devices 1 and 2 with a memory for recording data such as image data and a means for reading out and writing the image data or the like. In this arrangement the recorded data is reproduced when the information processing devices 1 and 2 give instructions to each other through the communication line 72.

Referring to FIG. 6, a ROM 21 stores a program for loading, e.g., an OS (Operating System) of this information processing device. This OS, an execute program, and execute data are loaded in a RAM 22 from an external storage 29 and executed in the RAM 22. A memory bus 23 is used to exchange data between a CPU 24 and each of the ROM 21 and the RAM 22.

A display 25 for displaying characters and drawings is, e.g., a CRT or an LCD. An I/O bus 26 is used to exchange data between the CPU 24 and each of input/output devices such as a keyboard 27 as an input device, a mouse 28 as a coordinate input device, and an external storage 29. The external storage 29 stores the OS, the execute program, and the execute data as described above and is also used as a swap device. A hard disk, for example, is used as the external storage 29.

A VRAM (VIDEO RAM) 30 is so designed that a bit map image such as a graphic pattern or a drawing to be displayed on the display 25 is transferred to this memory and the information developed in the memory is displayed on the display 25. An image compression and extension unit 33 compresses and extends image data and audio data. A network transmission and reception unit 34 controls a network 36.

Figure 1:
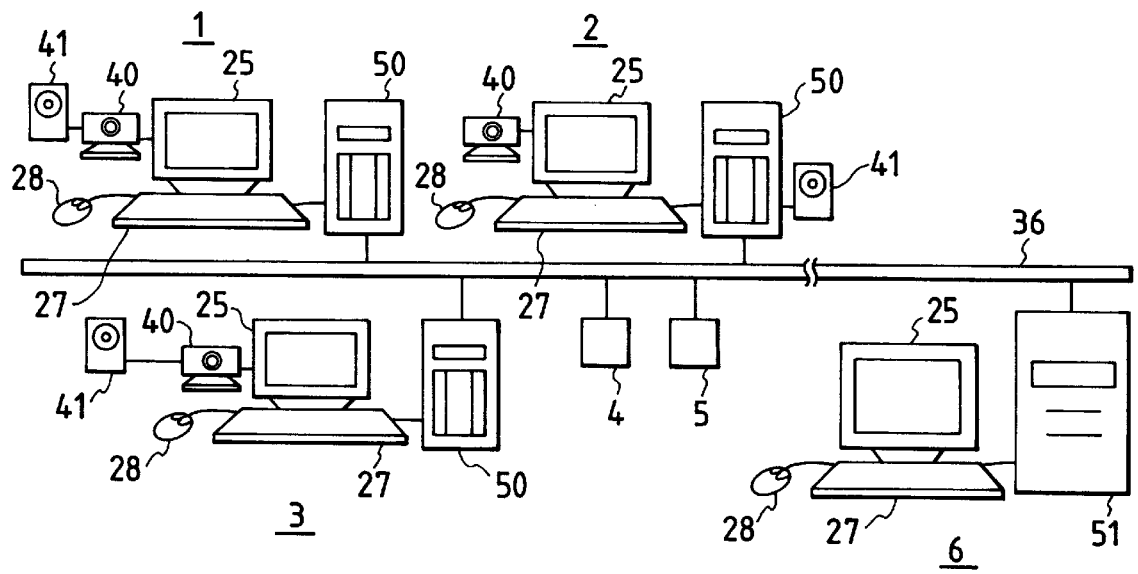
FIG. 1 is a view showing the outer appearance of a conventional television conference system.

An image input unit 35 is connected to the video camera 40, FIG. 1. An input image analog signal from a CCD of the video camera 40 is converted into a digital signal and developed in an internal RAM of the image input unit 35. The CPU 24 can read out the data from the RAM through the I/O bus 26.

As with the image input unit 35 described above, an audio input unit 37 also is connected to the video camera 40, FIG. 1. An input audio analog signal from a microphone (not shown) connected to the video camera 40 is converted into a digital signal and developed in an internal RAM of the audio input unit 37. The CPU 24 can read out the data from the RAM through the I/O bus 26.

An audio output unit 38 is connected to the loudspeaker 41, FIG. 1. An audio digital signal written in an internal RAM of the audio output unit 38 is converted into an analog signal and supplied to the loudspeaker 41.

Note that each of the time designation unit 66, the terminal unit designation unit 67, and the reproduction designation unit 68, FIG. 5, is constituted by the ROM 21, the RAM 22, the memory bus 23, the CPU 24, the I/O bus 26, the keyboard 27, and the mouse 28, FIG. 6. Note also that each of the first and second terminals 50 and 51, FIG. 1, is constituted by the ROM 21, the RAM 22, the memory bus 23, the CPU 24, the I/O bus 26, the external storage 29, the VRAM 30, and the network transmission and reception unit 34, FIG. 6.

An operation of transmitting the image and voice of a speaker from the information processing device with the arrangement shown in FIG. 6 will be described below.

An image analog signal of a speaker taken by the video camera 40, FIG. 1, is supplied to the image input unit 35, converted into a digital signal by the image input unit 35, and developed in the internal RAM. An audio analog signal of the speaker picked up by the microphone connected to the video camera 40 is supplied to the audio input unit 37, converted into a digital signal by the audio input unit 37, and developed in the internal RAM.

The CPU 24 reads out the image data and the audio data through the memory bus 23 and the I/O bus 26 and adds information such as header information to these data, thereby converting the data into the form which can be transmitted to the network 36. The CPU 24 then copies the packet thus generated into the RAM of the network transmission and reception unit 34 and issues a transmission instruction to the network transmission and reception unit 34. The network transmission and reception unit 34 broadcasts the packet to the network 36.

An operation when the information processing device with the arrangement shown in FIG. 6 receives the image and voice of a speaker will be described below.

In FIG. 6, the network transmission and reception unit 34 receives the broadcasted packet, develops the packet in the internal RAM, and informs the CPU 24 of the reception of the packet.

Upon receiving this information, the CPU 24 reads out the packet from the RAM of the network transmission and reception unit 34 and extracts the image data and the audio data from the packet. The CPU 24 then writes the extracted image data in the VRAM 30 and develops the audio data in the RAM of the audio output unit 38. The image data written in the VRAM 30 is displayed on the display 25. The audio data written in the RAM of the audio output unit 38 is converted into an analog signal and output to the loudspeaker 41, FIG. 1. In this way it is possible to display the image of a speaker transmitted from another information processing device on the display 25 and output the voice of the speaker to the loudspeaker 41.

FIG. 7 illustrates an example of the display contents on the display 25.

Figure 2:
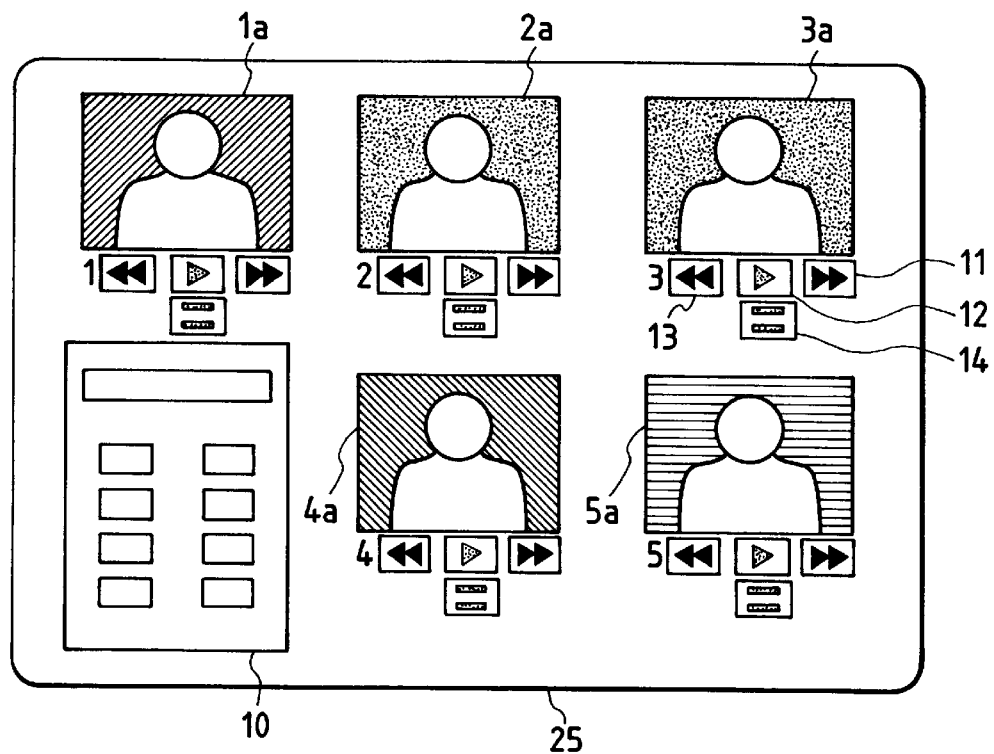
FIG. 2 is a view showing one example of the display contents in the conventional television conference system.
Figure 3B:
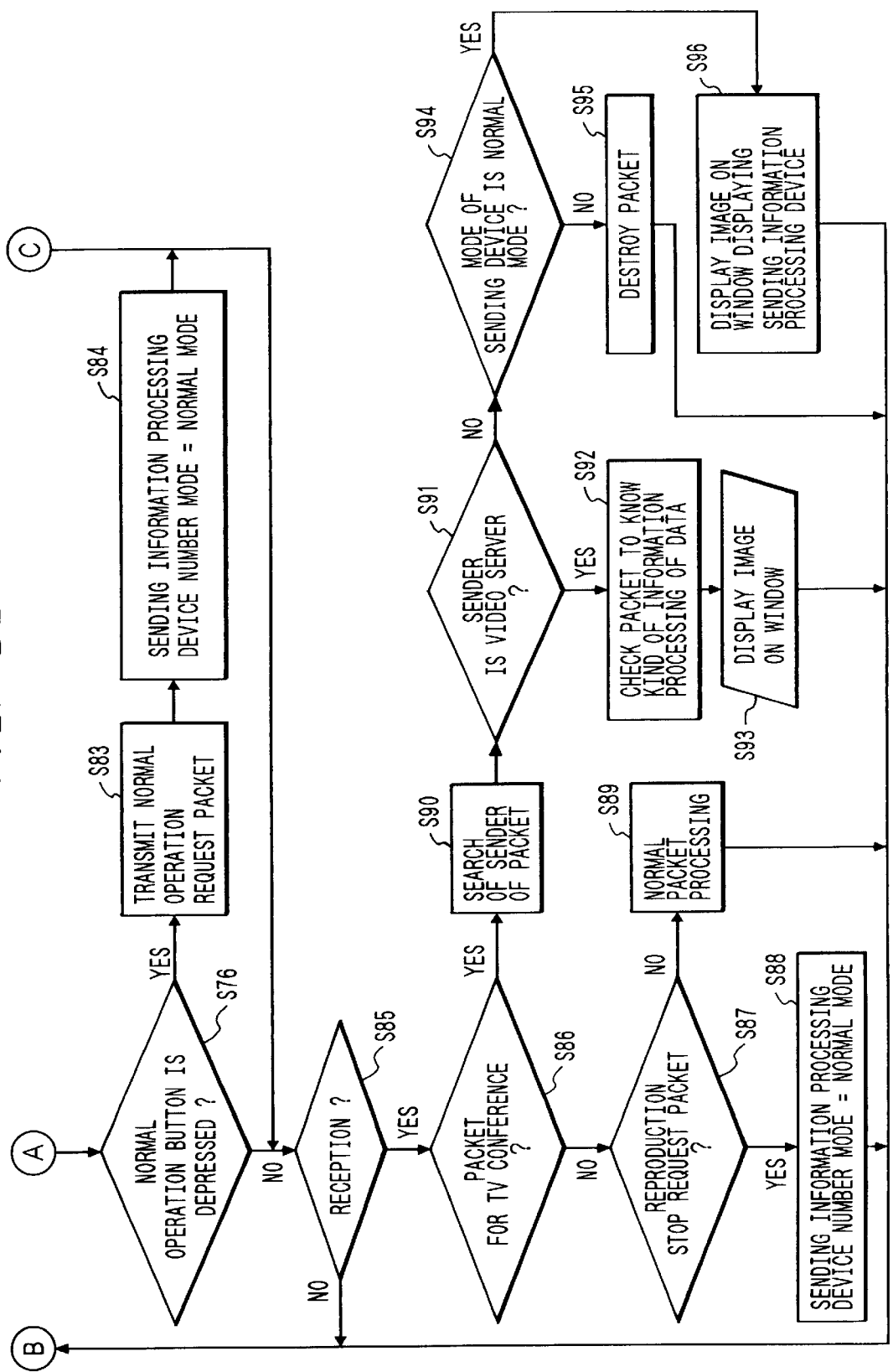
FIG. 3, comprised of FIGS. 3A and 3B, is a flow chart showing the operation of each information processing device as a conference terminal in the conventional television conference system.
Figure 4:
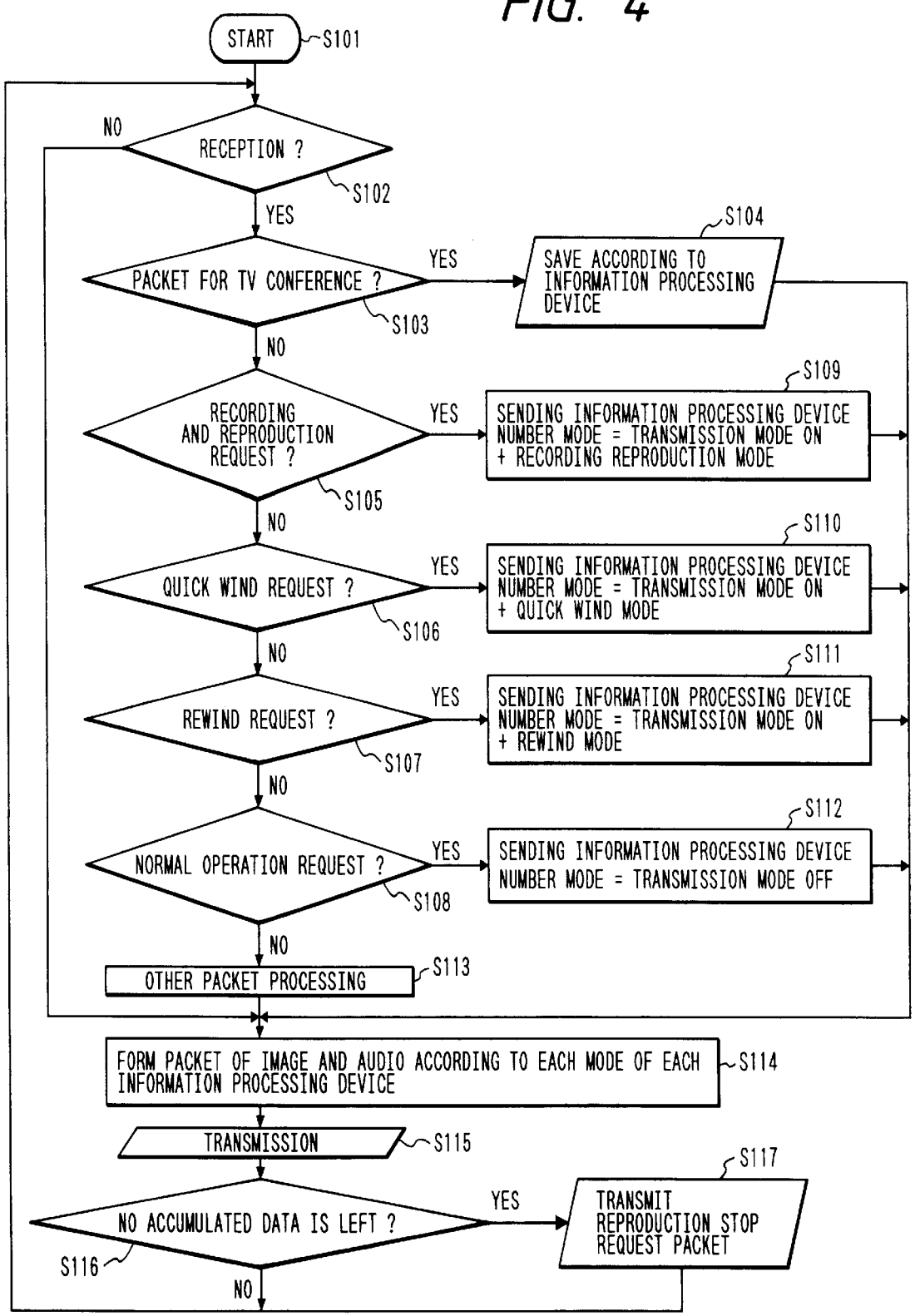
FIG. 4 is a flow chart showing the operation of an information processing device as a video server in the conventional television conference system.

In FIG. 7, the same reference numerals as in the display contents shown in FIG. 2 denote the same parts, and only the difference from FIG. 2 will be described below.

Referring to FIG. 7, an area 19 displays the time of an image currently being displayed and is also used as a time input button.

That is, when mouse clicking is performed on this time input button 19, a time input window 18, FIG. 8, pops up. In this example, a time input window which is presented when the time input button 19 corresponding to a second display window 2a is depressed is illustrated. A user inputs a desired time in this time input window 18. Consequently, it is possible to immediately reproduce image data and audio data at the corresponding time recorded in the sixth information processing device 6.

A procedure in the television conference system of this embodiment when a given one of the first to fifth information processing devices 1 to 5 used as the terminals of a television conference requests reproduction of image data and audio data recorded in the past in the sixth information processing device 6 used as the video server and displays the reproduced image will be described below with reference to the flow chart in FIGS. 9A and 9B.

Figures 9, 9A:
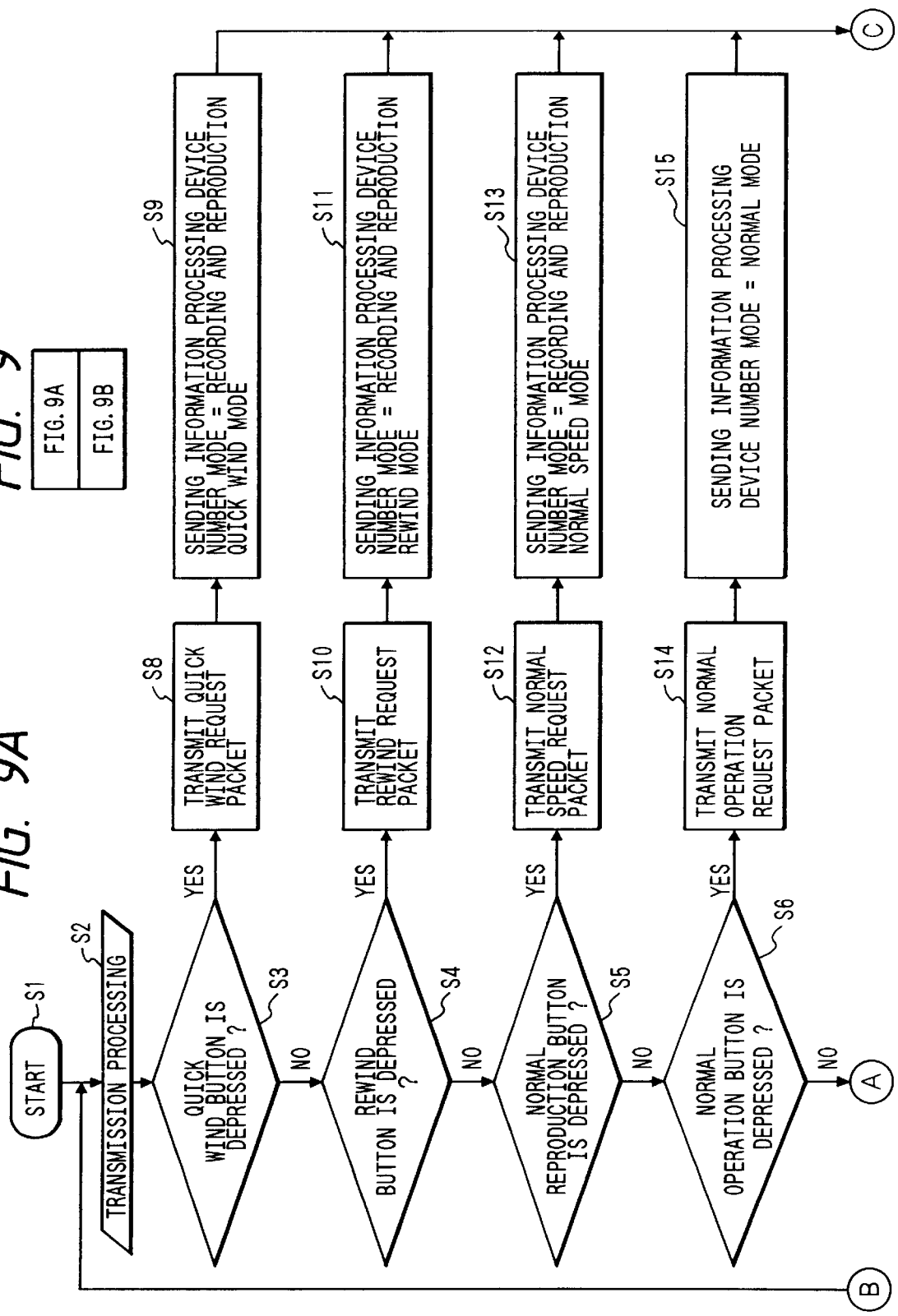
FIG. 9, comprised of FIGS. 9A and 9B, is a flow chart showing the operation of each information processing device as a conference terminal in the television conference system of this embodiment.
Figure 9B:
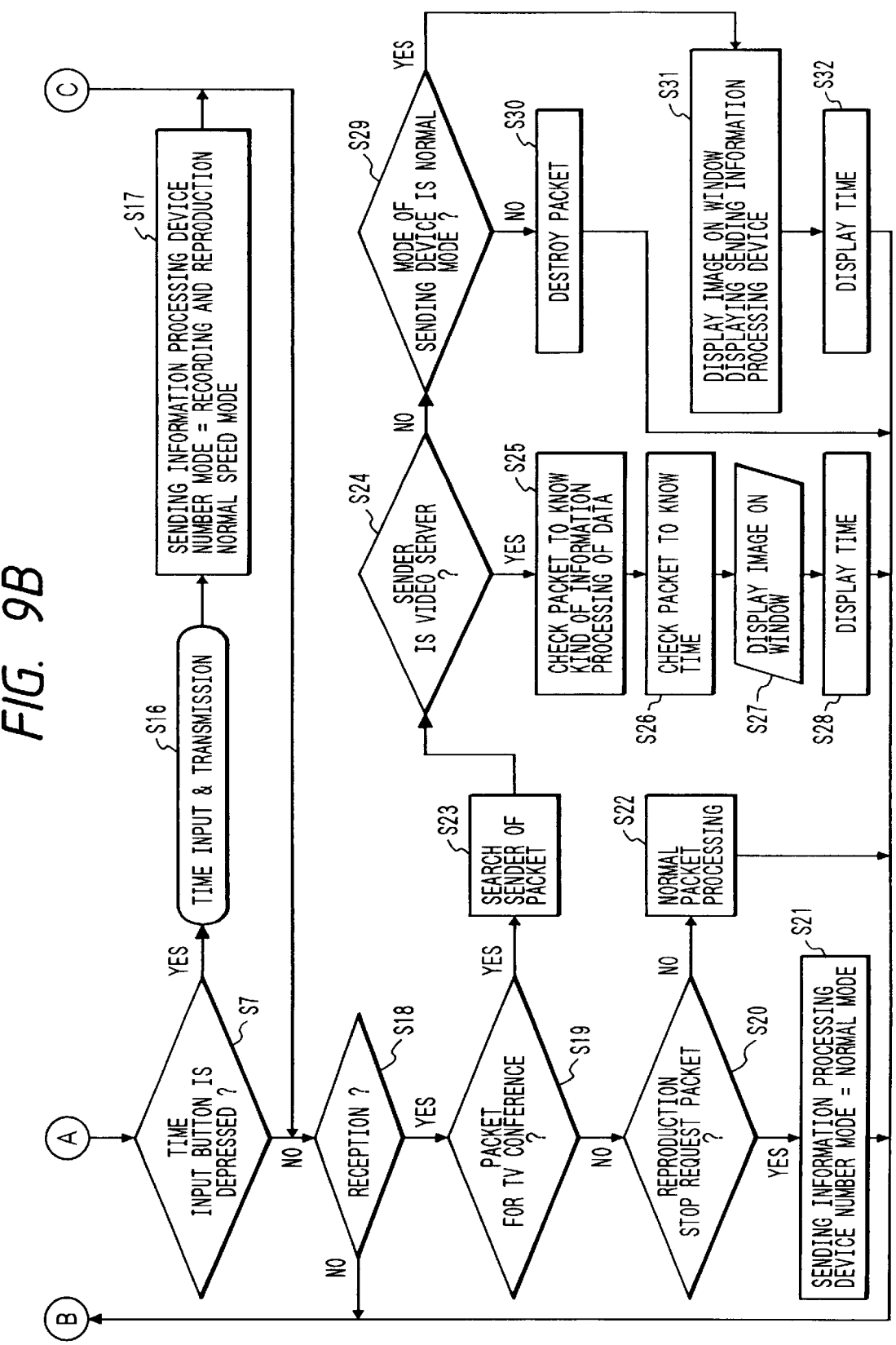

Referring to FIGS. 9A and 9B, the systems of the information processing devices 1 to 5 are activated in step S1. In step S2, each of the information processing devices 1 to 5 broadcasts input image data from the video camera 40 and input audio data from the microphone (not shown) connected to the video camera 40 to the network 36. In steps S3 to S7, whether any of a quick wind button 11, a normal reproduction button 12, a rewind button 13, a normal operation button 14, and the time input button 19, FIG. 7, is depressed is checked.

If it is determined in step S3 that the quick wind button 11 is depressed, the flow advances to step S8, and a packet containing the number (one of 1 to 5) of the information processing device corresponding to one of display windows 1a to 5a, FIG. 7, in which the quick wind button 11 is depressed and also containing the quick wind request is transmitted to the sixth information processing device 6 as the video server. In step S9, the mode of the display window in which the quick wind button 11 is depressed is set to a "recording and reproduction quick wind mode" which quickly reproduces the image data and the audio data recorded in the sixth information processing device 6.

If it is determined in step S4 that the rewind button 13 is depressed, the flow advances to step S10, and a packet containing the number of the information processing device corresponding to one of the display windows 1a to 5a, FIG. 7, in which the rewind button 13 is depressed and also containing the rewind request is transmitted to the sixth information processing device 6. In step S11, the mode of the display window in which the rewind button 13 is depressed is set to a "recording and reproduction rewind mode" which reproduces the image data and the audio data recorded in the sixth information processing device 6 while rewinding these data.

If it is determined in step S5 that the normal reproduction button 12 is depressed, the flow advances to step S12, and a packet containing the number of the information processing device corresponding to one of the display windows 1a to 5a, FIG. 7, in which the normal reproduction button 12 is depressed and also containing the normal speed reproduction request is transmitted to the sixth information processing device 6. In step S13, the mode of the display window in which the normal reproduction button 12 is depressed is set to a "recording and reproduction normal speed mode" which reproduces the image data and the audio data recorded in the sixth information processing device 6 at a normal speed.

If it is determined in step S6 that the normal operation button 14 is depressed, the flow advances to step S14, and a packet containing the number of the information processing device corresponding to one of the display windows 1a to 5a, FIG. 7, in which the normal operation button 14 is depressed and also containing the normal operation request is transmitted to the sixth information processing device 6. In step S15, the mode of the display window in which the normal operation button 14 is depressed is set to a "normal mode" which performs a normal television conference.

If it is determined in step S7 that the time input button 19 is depressed, the flow advances to step S16, and the user inputs a desired time. Also, a packet containing the number of the information processing device corresponding to one of the display windows 1a to 5a, FIG. 7, in which the time input button 19 is depressed and also containing the normal speed reproduction request is transmitted to the sixth information processing device 6.

More specifically, the processing in step S16 is done in accordance with the flow chart shown in FIG. 10.

Referring to FIG. 10, when the time input button 19 is depressed, the time input window 18 as illustrated in FIG. 8 pops up in step S41. In step S42, a certain time is input in this time input window 18. In step S43, whether the input time is correct is checked. Whether the input time is correct is determined by checking whether the minute of the time exceeds "59" or time before the opening of the conference is designated.

If the input time is incorrect, the flow returns to step S42 to redo the time input. If the input time is correct, the flow advances to step S44 to generate a packet in which the input time is added after the normal speed reproduction request. In step S45, the generated packet is transmitted to the sixth information processing device 6, and the flow advances to step S17, FIG. 9B. In step S17, the mode of the display window in which the time input button 19 is depressed is set to the "recording and reproduction normal speed mode" which reproduces the image data and the audio data recorded in the sixth information processing device 6 at a normal speed.

After the processing corresponding to the depression of any of the buttons 11 to 14 and 19 is done as described above, it is checked in step S18 whether a packet transmitted through the network 36 is received. If no packet is received, the flow returns to the transmission processing in step S2. If a packet is received in step S18, the flow advances to step S19 to check whether the received packet is for the television conference.

If the received packet is not for the television conference, the flow advances to step S20 to check whether the received packet is a reproduction stop request packet sent from the sixth information processing device 6. If the received packet is the reproduction stop request packet, the flow advances to step S21 to check which of the windows 1a to 5a the packet corresponds to. The mode of the corresponding window is then set to the normal mode. If the received packet is not the reproduction stop request packet, normal packet processing is performed in step S22.

On the other hand, if it is determined in step S19 that the received packet is for the television conference, the flow advances to step S23 to check whether the packet is sent from the sixth information processing device 6 as the video server. If it is determined in step S24 that the received packet is sent from the video server, the flow advances to step S25 to check the recorded data of which of the information processing devices 1 to 5 is used to reproduce the image data and the audio data contained in the packet. Also, in step S26 the time at which the image data and the audio data were recorded in the sixth information processing device 6 is checked.

In step S27, the reproduced image is displayed in the display window corresponding to the number of the information processing device found in step S25, and the reproduced voice is output to the loudspeaker 41. Also, in step S28 the time checked in step S26 is displayed in the time display area 19, FIG. 7.

If it is determined in step S24 that the received packet is not the packet from the sixth information processing device 6 as the video server, the flow advances to step S29 to check the mode of the display window corresponding to the sending information processing device of the packet.

If the checked mode is other than the normal mode (i.e., any of the recording and reproduction quick wind mode, the recording and reproduction rewind mode, and the recording and reproduction normal speed mode), this means that the image and voice from the sixth information processing device 6 are being reproduced. Accordingly, the packet is destroyed in step S30. If the mode of the packet sending device is the normal mode, the flow advances to step S31 to display the image contained in the packet in the display window corresponding to the sending information processing device. Also, in step S32 the current time is displayed in the time display area 19.

A procedure when the sixth information processing device 6 as the video server reproduces the image data and the audio data of a speaker recorded in the past in the internal second terminal 51 in accordance with requests from the information processing devices 1 to 5 will be described below with reference to the flow chart shown in FIGS. 11A and 11B.

Note that information of a sending information processing device number mode (to be described later) and information of a sending information processing device number time are stored in a memory as a table which uses the number of each of the information processing devices 1 to 5 serving as clients as the key. Therefore, both in reading out these information from the memory and in storing them in the memory, the number of each of the information processing devices 1 to 5 serving as clients is used as the key.

Figure 11B:
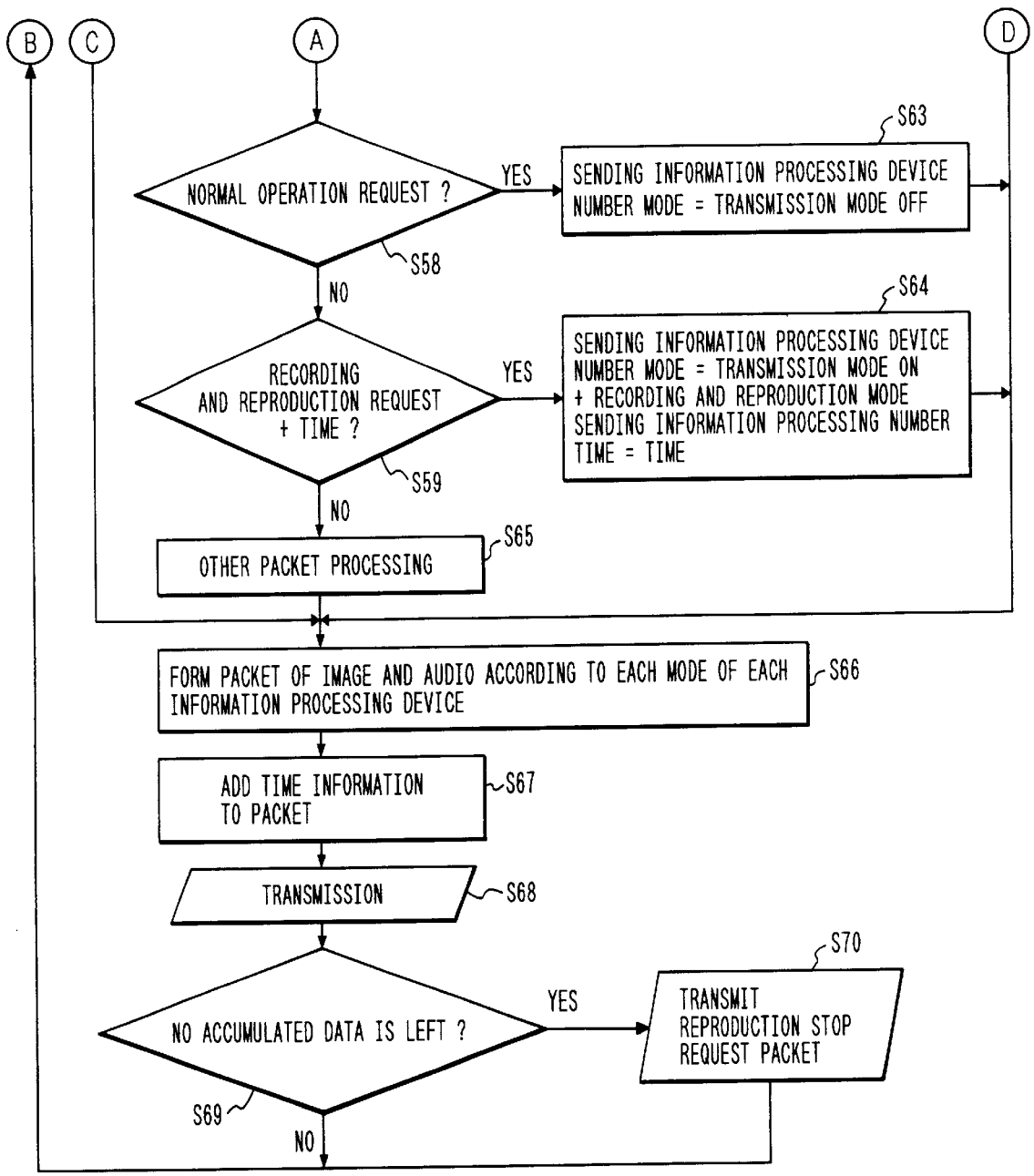
FIG. 11, comprised of FIGS. 11A and 11B, is a flow chart showing the operation of an information processing device as a video server in the television conference system of this embodiment.

Referring to FIGS. 11A and 11B, the system of the sixth information processing device 6 is activated in step S51. In step S52, the sixth information processing device 6 checks whether a packet sent from any of the first to fifth information processing devices 1 to 5 is received. If no packet is received, the flow jumps to processing in step S66. If a packet is received, the flow advances to step S53, and the sixth information processing device 6 checks whether the received packet is for the television conference.

If the received packet is for the television conference, in step S54 the sixth information processing device 6 checks the sending information processing device of the packet and writes the current time and the data contained in the packet into the file corresponding to the packet sending device. The flow then jumps to step S66. On the other hand, if the received packet is not for the television conference, the sixth information processing device 6 checks the request of the received packet in steps S55 to S59.

If the sixth information processing device 6 determines in step S55 that the received packet is the recording and reproduction normal speed request packet transmitted in step S12, FIG. 9A, and the packet does not contain time information, the flow advances to step S60. In step S60, the sixth information processing device 6 sets the sending information processing device number mode, which indicates whether the image data and the audio data are to be transmitted to the sending information processing device of the packet, to a "transmission mode ON+recording and reproduction mode", and also sets a negative value as the sending information processing device number time.

If the sixth information processing device 6 determines in step S56 that the received packet is the recording and reproduction quick wind request packet transmitted in step S8, FIG. 9A, the flow advances to step S61, and the sending information processing device number mode is set to a "transmission mode ON+quick wind mode".

If the sixth information processing device 6 determines in step S57 that the received packet is the recording and reproduction rewind request packet transmitted in step S10, FIG. 9A, the flow advances to step S62, and the sending information processing device number mode is set to a "transmission mode ON+rewind mode".

If the sixth information processing device 6 determines in step S58 that the received packet is the normal operation request packet transmitted in step S14, FIG. 9A, the flow advances to step S63, and the sending information processing device number mode is set to a "transmission mode OFF".

If the sixth information processing device 6 determines in step S59 that the received packet is the packet transmitted in step S16, FIG. 9B, which contains the time information and the recording and reproduction normal speed request, the flow advances to step S64. In step S64, the sixth information processing device 6 sets the sending information processing device number mode to the "transmission mode ON+recording and reproduction mode" and also sets the time contained in the packet as the sending information processing device number time. If the received packet is none of these packets, the sixth information processing device 6 performs normal packet processing in step S65.

After performing the processing corresponding to the type of received packet in this manner, in step S66 the sixth information processing device 6 checks, for each of the information processing devices 1 to 5, the contents of the sending information processing device number mode set as described above. The sixth information processing device 6 forms a packet of image data and audio data in accordance with the checked sending information processing device number mode.

For example, if the transmission mode is ON and is the quick wind mode, the sixth information processing device 6 successively forms packets of one frame by using the image data of a frame skipped by several frames in the forward direction from the last frame used of a plurality of consecutive frames. If the transmission mode is ON and is the rewind mode, the sixth information processing device 6 successively forms packets of one frame by using the image data of a frame skipped by several frames in the backward direction from the last frame used of a plurality of consecutive frames.

If the transmission mode is ON and is the recording and reproduction mode and if a negative value is set as the sending information processing device number time, the sixth information processing device 6 successively forms packets of one frame by using the image data of a plurality of frames succeeding in the forward direction. If the transmission mode is ON and is the recording and reproduction mode and if a positive value is set as the sending information processing device number time, this means that this positive value is input from the time input button 19. Accordingly, the sixth information processing device 6 searches for a frame in which this time is recorded and successively forms packets of one frame by using the image data of a plurality of frames succeeding in the forward direction from that frame.

Note that no last image data used exists immediately after the transmission mode is turned on. If this is the case, therefore, a packet of one frame is formed by using the first image data in the case of the quick wind mode or the recording and reproduction mode, and by using the latest image data in the rewind mode case.

In step S67, the sixth information processing device 6 adds the time information to the packets formed as described above. In step S68, the sixth information processing device 6 transmits the resulting packets to the request source of the first to fifth information processing devices 1 to 5. If the sixth information processing device 6 determines in step S69 that no accumulated data is left in the device 6 (when data to be reproduced exceeds the trailing end of the data in the quick wind mode or in the recording and reproduction mode, or when data to be reproduced exceeds the leading end of the data in the rewind mode), the sixth information processing device 6 transmits a reproduction stop request packet to the corresponding information processing device in step S70. This reproduction stop request packet is interpreted in step S20, FIG. 9B, and consequently the corresponding information processing device as the conference terminal is set in the normal mode.

In the above embodiment, an absolute time is displayed in the time display area 19 and this absolute time is designated in reproducing an image and a voice recorded in the past. However, it is also possible to display the time elapsed from the opening of a conference and designate this elapsed time from the opening of a conference in reproducing an image and a voice recorded in the past.

As described above, in this embodiment the time information is displayed in the display 25 of each of the information processing devices 1 to 5 for the conference terminals participating in a television conference. Therefore, by monitoring the display time the user can readily determine whether the image displayed on the display 25 and the output voice from the loudspeaker 41 are taken from the television conference currently being normally held or are reproduced from data recorded in the past. Also, if the data recorded in the past is being reproduced, the user can easily recognize when that data was recorded.

Also, while a television conference is being held by using the information processing devices 1 to 5 as the terminals of the television conference, images and voices in the conference are recorded in the sixth information processing device 6, and the recorded images and voices are reproduced in accordance with requests from the information processing devices 1 to 5. In a television conference system having this recording and reproducing means, images and voices recorded in the past are reproduced by designating the recording time. This allows a user to easily search for images and voices in the conference recorded in the past.

Additionally, in this embodiment the user designates a desired time by depressing the time input button 19 arranged near each of the display windows 1a to 5a, thereby reproducing images and voices in the conference recorded in the past. Accordingly, the user can easily designate the information processing device the past conference image and voice of which he or she wants to reproduce.

As has been described above, in this embodiment the display unit is so designed as to display image data together with time information. Therefore, by monitoring this time information the user can recognize when the image data currently being displayed in the display unit and the audio data output to the audio output unit were taken.

Also, the recording time of image data and audio data can be recorded and reproduced together with these data, and this recording time is displayed in the display unit when an image and a voice recorded in the past are reproduced. Accordingly, by monitoring the display time the user can readily determine whether the image displayed on the display unit and the voice output to the audio output unit are taken from a television conference currently being normally held or is reproduced from data recorded in the past. Furthermore, if the data recorded in the past is being reproduced, the user can easily recognize when that data was recorded. By using this display time as the key, therefore, the user can readily search for and reproduce past images and voices which he or she wants to see and hear.

Additionally, since an absolute time or the time elapsed from the opening of a conference is displayed, the user can easily recognize when an image currently being displayed on the display unit and a voice output to the audio output unit are taken. This permits the user to readily search for past images and voices which he or she wants to see and hear.

Furthermore, the system includes the time designation unit for designating an arbitrary time and a terminal unit designation unit for designating a given information processing unit. On the basis of information of the time designated by the time designation unit and information of the information processing device designated by the terminal unit designation unit, the corresponding image data and audio data are reproduced together with recording time information from the storage unit. Consequently, a desired image and voice can be rapidly and reliably reproduced only by designating the time and the information processing device. This further facilitates the search and reproduction of a desired recorded image and voice. At this time, by designating a given information processing device it is possible to reproduce the image and the voice, recorded in the past, of a given speaker participating in the television conference.

Also, the time designation unit is provided for each of a plurality of information processing devices. This facilitates designating the past recorded image and voice of which information recording device are to be reproduced.

In addition, an absolute time or the time elapsed from the opening of a conference is designated, resulting in an easy time designation.

Moreover, the system includes the recording unit for recording image information in a recording medium by relating the image information to time information, the time designation unit for designating an arbitrary time, and the reproduction unit for reproducing the image information recorded in the recorded medium in accordance with the time designated by the time designation unit. In this system the image information recorded in the recording medium is reproduced in accordance with a given designated time. This allows reproduction of image information at any designated time, so the user can easily search for and reproduce a desired image recorded in the past. This results in a very improved system operability for the user.

The present invention can be practiced in other various forms without departing from the spirit and scope of the invention.

In other words, the foregoing description of embodiments has been given for illustrative purpose only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An information processing apparatus which is connectable to a storage apparatus which stores: (i) a plurality of information data transmitted from a plurality of connected communication apparatuses; and (ii) storing time data regarding each of said plurality of information data, said information processing apparatus comprising:

first designation means for designating one of the connected plurality of communication apparatuses during a communication with the plurality of communication apparatuses, and for generating first designation data indicating the designated communication apparatus;

second designation means for numerically designating storing time of information data transmitted by the communication apparatus designated by said first designation means, and for generating second designation data indicating designated storing time;

transmission means for transmitting the first designation data, the second designation data, and an instruction to said storage apparatus to read out desired information data from said storage apparatus at a normal reproduction speed; and output means for outputting to a display apparatus information data currently received from at least one of the plurality of connected communication apparatuses and the desired information data read out from said storage apparatus, wherein said display apparatus simultaneously displays the currently received information data and read-out information data output from said output means for the plurality of communication apparatus, and wherein said display apparatus also displays current time corresponding to the currently received information data and the storing time corresponding to the read-out information data output from said output means.

2. Apparatus according to claim 1, wherein the storing time data designated by said second designation means comprises a time when the information data was stored in said storage apparatus.

3. Apparatus according to claim 1, further comprising:

receiving means for receiving the information data read out from said storage apparatus, and wherein storing time data indicating a time when the information data was stored in said storage apparatus, is added to the read out information data;

display means for displaying the added storing time data received by said receiving means.

4. Apparatus according to claim 3, wherein said receiving means also receives the information data directly from said plurality of communication apparatuses, and wherein said display means displays a time when the information data was received from said plurality of communication apparatuses.

5. Apparatus according to claim 1, wherein the information data comprises image data.

6. Apparatus according to claim 1, wherein the information data comprises audio data.

7. An apparatus according to claim 1, wherein said display apparatus displays present time corresponding to the information data which is being communicated.

8. Apparatus according to claim 1, wherein said designation means numerically designates storing time of information data transmitted by the communication apparatus designated by said first designation means in response to manual input of the storing time.

9. An information processing apparatus connected to a plurality of communication apparatuses, said information processing apparatus comprising:

receiving means for receiving information data transmitted from a connected communication apparatus, wherein the information data comprises image data; and display means for displaying a time associated with the information data received by said receiving means, said display means having a mode for displaying the time based on time data included in the received information data, and a mode for displaying the time when the information data was received by said receiving means, wherein, in each mode, said display means displays an image corresponding to the image data together with the time associated with the image data, and wherein said display means simultaneously displays a plurality of images corresponding respectively to a plurality of image data transmitted from the plurality of communication apparatuses.

10. An information processing method used in an information processing apparatus which is connected to a storage apparatus which stores: (i) a plurality of information data transmitted from a plurality of communication apparatuses; and (ii) storing time data of each of said plurality of information data, and where a reproduction speed of stored information data from the storage apparatus is variable, said method comprising the steps of:

a first designation step of designating one of the plurality of communication apparatus, during a communication with the plurality of communication apparatuses, and generating a first designation data indicating the designated communication apparatus;

a second designation step of designating storing time of information data transmitted by the communication apparatus designated in said first designation step, and generating second designation data indicating the designated storing time;

a transmission step of transmitting the first designation data, the second designation data, and an instruction to the storage apparatus to read out desired information data from the storage apparatus at a normal reproduction speed; and an output step of outputting the information data currently received from at least one of the plurality of connected communication apparatuses and the information data read out from the storage apparatus, for simultaneously displaying in a display the received information data and read-out information data output in said output step, and for displaying in the display the storing time corresponding to the read-out information data output from said output means.

11. An information processing method used in an information processing apparatus connected to a plurality of communication apparatuses, said method comprising the steps of:

a receiving step of receiving information data transmitted from one of the communication apparatuses, wherein the information data comprises image data; and a display step of displaying a time associated with the information data received in said receiving step, said display step having a mode for displaying the time based on time data included in the received information data, and a mode for displaying the time when the information data was received in said receiving step, wherein, in each mode, said display step includes displaying an image corresponding to the image data together with the time associated with the image data, and said display step further includes simultaneously displaying a plurality of images corresponding respectively to a plurality of image data transmitted from the plurality of communication apparatuses in said receiving step.

12. An information processing apparatus which is connectable to a storage apparatus which stores: (i) a plurality of information data transmitted from a plurality of connected communication apparatuses; and (ii) storing time data regarding each of said plurality of information data, and where a reproduction speed of stored information data from the storage apparatus is variable, said information processing apparatus comprising:

first designation means for designating one of the connected plurality of communication apparatuses during a communication with the plurality of communication apparatuses, and for generating first designation data indicating the designated communication apparatus;

second designation means for designating storing time of information data for reading-out information data transmitted by the communication apparatus designated by said first designation means, and for generating second designation data indicating designated storing time; and transmission means for transmitting the first designation data, the second designation data, and an instruction to said storage apparatus to read out corresponding information data from said storage apparatus at a normal reproduction speed.

13. An apparatus according to claim 1, wherein the designation of the storing time is executed by the input of numbers by a user.

* * * * *

UNITED STATES PATENT AND TRADEMARK OFFICE
CERTIFICATE OF CORRECTION

| | | |
|---|---|---|
| PATENT NO. | : 6,538,684 B1 | Page 1 of 1 |
| DATED | : March 25, 2003 | |
| INVENTOR(S) | : Akitomo Sasaki | |

It is certified that error appears in the above-identified patent and that said Letters Patent is hereby corrected as shown below:

<u>Title page,</u>
Item [56], References Cited, FOREIGN PATENT DOCUMENTS,
"02119491" should read -- 02-119491 --.

<u>Column 20,</u>
Line 4, "claim 1," should read -- claim 12, --.

Signed and Sealed this

Twenty-fifth Day of November, 2003

JAMES E. ROGAN
*Director of the United States Patent and Trademark Office*